United States Patent [19]
Deguchi et al.

[11] Patent Number: 5,294,660
[45] Date of Patent: Mar. 15, 1994

[54] POLYPHENYLENE SULFIDE FILM AND PROCESS OF MANUFACTURING THE SAME

[75] Inventors: Yukichi Deguchi, Otsu; Yukio Noguchi, Shiga; Masaaki Sudo, Kyoto; Kiyohiko Ito, Otsu, all of Japan

[73] Assignee: Toray Industries, Inc., Japan

[21] Appl. No.: 29,925

[22] Filed: Mar. 11, 1993

Related U.S. Application Data

[63] Continuation of Ser. No. 897,582, Jun. 11, 1992, abandoned, which is a continuation of Ser. No. 445,634, Dec. 26, 1989, abandoned.

[30] Foreign Application Priority Data

Mar. 7, 1988 [JP] Japan .................. 63-54530

[51] Int. Cl.$^5$ .................... C08J 5/18; C08K 3/34; C08K 5/03
[52] U.S. Cl. .................... 524/492; 524/493; 525/189; 525/537
[58] Field of Search .............. 524/492, 493; 525/189, 525/537

[56] References Cited

U.S. PATENT DOCUMENTS

| | | | |
|---|---|---|---|
| 4,476,284 | 10/1984 | Cleary | 525/537 |
| 4,568,616 | 2/1986 | Seifried et al. | 428/480 |
| 4,731,390 | 3/1988 | Mizuno et al. | 521/180 |
| 4,774,298 | 9/1988 | Mizuno et al. | 528/388 |
| 4,775,571 | 10/1988 | Mizuno et al. | 528/388 |
| 4,777,228 | 10/1988 | Mizuno et al. | 528/388 |
| 4,839,129 | 6/1989 | Mizuno et al. | 528/388 |
| 4,894,419 | 1/1990 | Mizuno et al. | 525/537 |
| 4,985,512 | 1/1991 | Iizuka et al. | 525/537 |

FOREIGN PATENT DOCUMENTS 55-34968 11/1980 Japan.

OTHER PUBLICATIONS

"Emulsion Polymerization With Mixtures of Anionic and Nonionic Surfactants," Martin E. Woods et al, Paint Research Institute of the Federation of Societies for Paint Technology, Proceedings No. 61, Fol. 40, No. 527, Dec. 1968, pp. 541–548.

*Primary Examiner*—John C. Bleutge
*Assistant Examiner*—Helen F. Lee
*Attorney, Agent, or Firm*—Austin R. Miller

[57] ABSTRACT

The present invention provides a polyphenylene sulfide film which consists essentially of a resin composition containing polyphenylene sulfide as major constituent, in which fine particles with an average particle size of 0.05–3 μm are dispersed, the fine particles having a single particle index of not less than 0.5. The polyphenylene sulfide film of the present invention is excellent in not only the slipping property but also the number of electrical insulation defects are extremely small, so that the film of the present invention is useful for the dielectric film of film capacitor with stable initial characteristics. Further, since the film of the present invention is excellent in the slipping property and surface smoothness, so that it is useful as a base film for magnetic recording media with excellent magnetic conversion characteristics and excellent drop out characteristics.

5 Claims, No Drawings

POLYPHENYLENE SULFIDE FILM AND PROCESS OF MANUFACTURING THE SAME

This application is a continuation of application Ser. No. 07/445,634, filed Dec. 26, 1989, ABN, which is a continuation of application Ser. No. 07/897,582, filed Jun. 11, 1992 abandoned.

TECHNICAL FIELD

This invention relates to a polyphenylene sulfide film and a process of manufacturing the same. The polyphenylene sulfide film of the present invention is especially useful as a dielectric material of capacitors and as a base film of magnetic recording media.

BACKGROUND ART

Polyphenylene sulfide films are conventionally used as F-class insulation thin material in variety of electric equipments and electric parts. Fine particles are often incorporated in the polyphenylene sulfide films in order to improve the slipping property of the film. Such a polyphenylene sulfide film containing the fine particles is manufactured by, as described in Japanese Patent Disclosure (Kokai) No. 34968/80, admixing the solid fine particles with the polypheneylene sulfide powder with a Henschel mixer or the like, stirring the resultant mix under fused condition to disperse the fine particles, and biaxially stretching the resulting polyphenylene sulfide resin composition under specific conditions. However, in the polyphenylene sulfide films prepared by this process, the dispersion of the fine particles is not uniform. As a result, not only is the slipping property of the film poor because of the large aggregations of the microparticles, but also insulation defects are likely to be formed especially in the case where the thickness of the film is not more than 10 $\mu m$, so that the films have poor characteristics as dielectric films of capacitors. Further, when such a polyphenylene sulfide film is used as a base film of magnetic recording media such as floppy disks, drop out is likely to occur due to the large protrusion of the surface of the film. A polyphenylene sulfide film which has a good slipping property and high surface smoothness, and which has a reduced number of insulation defects, has not yet been obtained.

DISCLOSURE OF THE INVENTION

Accordingly, an object of the present invention is to provide a polyphenylene sulfide film (hereinafter also referred to as "PPS film") which has excellent surface smoothness and slipping property, and which has a reduced number of insulation defects.

Another object of the present invention is to provide a capacitor which has excellent solder resistance, frequency characteristics and excellent thermal characteristics, and in which the distribution of the capacity and of the-withstand voltage is small.

Still another object of the present invention is to provide a magnetic recording media with which drop out rarely occurs and which has excellent dimensional stability and heat resistance.

Still another object of the present invention is to provide a process of producing a polyphenylene sulfide film which has excellent surface smoothness and slipping property, and which has a reduced number of insulation defects.

The present inventors intensively studied to find that a polyphenylene sulfide film containing fine particles with specific average particle size, which has a single particle index in a specific range, has excellent surface smoothness and slipping property, and have established a process of manufacturing this polyphenylene sulfide film to complete the present invention.

That is, the present invention provides a polyphenylene sulfide film which consists essentially of a resin composition containing polyphenylene sulfide as a major constituent, in which fine particles with an average particle size of 0.05-3 $\mu m$ are dispersed, the fine particles having a single particle index of not less than 0.5.

The present invention further provides a capacitor comprising e biaxially oriented polyphenylene sulfide film which consists essentially of a resin composition containing polyphenylene sulfide as a major constituent, in which fine particles with an average particle size of 0.05-3 $\mu m$ are dispersed, which fine particles have a single particle index of not less than 0.5, as a major dielectric material and an inner electrode made of a metal foil or a metal thin layer.

The present invention further provides a magnetic recording media comprising a biaxially oriented polyphenylene sulfide film which consists essentially of a resin composition containing polyphenylene sulfide as a major constituent, in which fine particles with an average particle size of 0.05-3 $\mu m$ are dispersed, which fine particles have a single particle index of not less than 0.5, and a magnetic layer formed on at least one surface of the polyphenylene sulfide film.

The present invention still further provides a process of producing polyphenylene sulfide film comprising the steps of mixing a slurry of fine particles containing the fine particles dispersed in a liquid medium with a boiling point of 180°-290° C. with polyphenylene sulfide powder such that the average particle size of the fine particles is not larger than 3 $\mu m$, the amount of the fine particles being 1% by weight to 100% by weight with respect to the polyphenylene sulfide; supplying the resulting mixture to an extruder having at least one level of vent to fuse the polymer; eliminating the liquid medium of the slurry from the vent; and extruding the resulting polyphenylene sulfide in which the fine particles are dispersed to obtain a film in which the fine particles are dispersed.

The present invention still further provides a process of producing a polyphenylene sulfide film comprising the step& of supplying polyphenylene sulfide in a cylinder of an extruder having at least one level of vent; compulsively injecting into the cylinder of the extruder a slurry of fine particles containing fine particles dispersed in a liquid medium with a boiling point of 180°-290° C., which fine particles are dispersed in the liquid medium such that the average particle size thereof is not larger than 3 $\mu m$, in the amount of 1% by weight to 100% by weight in terms of the fine particles with respect to the polyphenylene sulfide polymer before and/or after the polymer is fused; eliminating the liquid medium alone from the vent; and extruding the mixture of the polymer and the microparticles to produce a film in which the fine particles are dispersed.

The polyphenylene sulfide film of the present invention is excellent in slipping property and surface smoothness, and the number of the insulation defects in the film is reduced. The polyphenylene sulfide film has excellent heat resistance, dimensional stability and excellent electric characteristics, which are inherent to polyphenylene sulfide film. Thus, if the polyphenylene sulfide film of the present invention is used as dielectrics of a capacitor, a capacitor which has excellent solder resistance, frequency characteristics and excellent thermal characteristics, in which the distribution of the capacity and the withstand voltage are small, may be obtained. Further, if the polyphenylene sulfide film of the present invention is used as a base film of a magnetic recording medium, a magnetic recording medium with which the drop out rarely occurs may be obtained.

BEST MODE FOR CARRYING OUT THE INVENTION

In the present invention, the reference to a resin composition containing polyphenylene sulfide as a major constituent (hereinafter referred to also as "PPS resin composition") means a composition containing poly-p-phenylene sulfide in the amount of 70% by weight or more. If the content of the poly-p-phenylene sulfide is less than 70% by weight, the heat resistance, frequency characteristics and the thermal characteristics of the film made from the resin composition are degraded. As long as the amount is not less than 30% by weight, other resins and/or various additives may be incorporated. The melt viscosity of the PPS may preferably be 500 to 12000 poise at 300° C. and at a shear rate of 200 sec$^{-1}$ because excellent heat resistance, dimensional stability and mechanical property as well as excellent thickness uniformity of the film may be obtained. It should be noted that the melt viscosity of the resin composition is identical with that of the PPS film finally obtained.

The term "poly-p-phenylene sulfide" (hereinafter referred to also as "PPS") means a polymer in which not less than 70 mol % (preferably not less than 85 mol %) of the repeating unit is a unit expressed by the formula

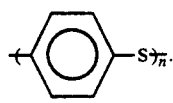

If the content of the repeating unit represented by the formula is less than 70 mol %, the crystallinity of the polymer is degraded and the thermal transition point is lowered, so that excellent heat resistance, dimensional stability and mechanical properties of the film, which are characteristic to the PPS films, may not be obtained. As long as the content is less than 30 mol % (preferably less than 15 mol %), other copolymerizable units, e.g., a unit containing copolymerizable sulfide bond may be incorporated.

The polyphenylene sulfide film of the present invention contains fine particles. In the present invention, the fine particles are, at least 350° C., an assemblage of solid particles, and the particles may be made of an inorganic or an organic material. Examples of the material of the fine particles may include minerals, metals, metal oxides, metal salts and organic polymer particles such as spherical silica (colloidal silica), dry silica, wet silica, alumina, calcium carbonate, titanium oxide, aluminum silicate and barium sulfate. These fine particles may be empolyed individually or in combination.

Examples of the organic polymer particles may include (crosslinked) divinylbenzene/styrene copolymer, polyimides and silicone resins particles. In cases where organic polymer particles are employed, the particle size may be adjusted not by pulverizing the polymer, but may preferably be adjusted in the particle-forming step such as emulsion polymerization. Further, the 10% weight reduction point in the TGA curve may preferably be not lower than 350° C., (more preferably not lower than 400° C.) in view of the foaming in the step of extrusion. Although there is no upper limit of the 10% weight reduction point, it is difficult to produce the particles with a 10% weight reduction point higher than 600° C.

In the present invention, the sphericity (longer axis/shorter axis) of the fine particles may preferably be not more than 1.3 (more preferably not more than 1.1) in view of the scratch resistance, surface smoothness and slipping property of the film. Examples of the fine particles with this range of sphericity may include spherical silica, spherical crosslinked polystyrene and spherical silicone.

Although the content of the fine particles (in cases where two or more kinds of fine particles are employed, the total content thereof) in the film of the present invention is not restricted, it may preferably be 0.01-8.0% by weight, more preferably 0.03-5.0% by weight, still more preferably 0.1-2.0% by weight in view of the balance between the surface smoothness and slipping property.

The fine particles employed in the present invention have an average particle size of 0.05 to 3 μm, preferably 0.1 to 1.5 μm in the film. If the average particle size is smaller than the lower limit of the above-mentioned range, the slipping property of the film is poor, so that scratches are likely to be formed on the surface of the film during the manufacturing process of the film or during the manufacturing process of the capacitor or the magnetic recording medium. On the other hand, if the average particle size of the fine particles are larger than the upper limit of the above-mentioned range, the volume of the shaved material is increased due to the elimination of the fine particles from the film, and the magnetic conversion of a magnetic recording medium employing the film is degraded. Especially, when a film with a thickness of not more than 10 μm is produced, the increase in the volume of the above-mentioned shaved material is prominent and the withstand voltage of a capacitor containing the film as the dielectric is degraded, so that it is not preferred.

In the film of the present invention, the single particle index of the fine particles in the film is not less than 0.5, preferably not less than 0.7, more preferably not less than 0.9. The term "single particle index" is defined as (A-B)/A wherein A represents the total area of the particles and B represents the area occupied by the aggregates formed of not less than two particles. As is apparent from this definition, if all of the fine particles exist as a single particle, the single particle index is 1. If the single particle index is less than 0.5, the volume of the shaved material is increased due to the elimination of the fine particles from the film and the magnetic conversion characteristics of the magnetic recording media employing the film is degraded. Especially, when a film with a thickness of not more than 10 um is produced, the increase in the volume of the above-mentioned shaved material is prominent and the withstand voltage of a capacitor containing the film as the dielectric is degraded, so that it is not preferred.

Although the polyphenylene sulfide film of the present invention may be non-oriented or uni-oriented, in view of the physical properties such as mechanical properties and heat resistance, biaxially oriented film is preferred. The term "biaxially oriented film" herein means a film produced by biaxially orienting an amorphous film consisting essentially of a resin composition containing polyphenylene sulfide as a major constituent. It is preferred that crystallization degree of the film determined by X-ray diffraction be 25%–45%, and the orientation factor OF determined for the crystal peak of $2\theta$ from 20° to 21° by wide angle X-ray diffraction be 0.07–0.5 in the End and Edge directions and 0.6–1.0 in the Through direction.

In the polyphenylene sulfide film of the present invention, it is preferred that the number of crude protrusions X (protrusions/100 cm$^2$) satisfy the following equation (1) because the formation of the scratches during the manufacturing process of the film capacitor or the magnetic recording medium, and the frequency of the drop out is smaller and the magnetic conversion characteristics are improved in the magnetic recording medium employing the film.

$$x \leq 6000 Ra$$

wherein Ra means center line average surface roughness of the film surface.

The PPS film of the present invention preferably has a surface gloss GS (60°) of 115%–200%, more preferably 0%–175%. If the surface gloss GS (60°) is within the above-described range, the capacitance stability is enhanced, when the film is used as the dielectrics of a capacitor, and the insulation defects of the film is reduced, so that the withstand voltage of the capacitor is increased. The surface gloss GS(60°) herein means the gloss of the film surface determined according to the 60 degrees mirror face gloss-measuring method defined in JIS-8741 (1962). The direction of measurement is selected such that the impinging light beam is perpendicular to the longitudinal direction of the film. In cases where the film is transparent, since the reflection from the surface opposite to the surface to be measured is substantial, the measurement is conducted after applying black pigment on the opposite surface.

It is preferred that the surface of the PPS film of the present invention have protrusions with a height of 0.05 um or higher in the number of 5.0 protrusions/mm in terms of protrusion line density. If the number of the protrusions is within this range, not only the ease of handling of the film is improved, but also the insulation defects of the film are reduced, so that the fraction defective of the withstand voltage of a capacitor containing dielectrics made of the film of the present invention is decreased to an extremely low level. The height of the protrusions is determined using a stylus type surface roughness meter under the conditions hereinbelow described. More particularly, if the top level of the "i"th peak of a roughness curve obtained with a vertical magnification of N moving the stylus at a velocity of 0.1 mm/sec is Mi and the level of the valley at the left side of the "i"th peak is Vi, the height Pi of the "i"th protrusion is defined by the following equation:

$$Pi = (Mi - Vi)/N$$

In this case, the moving direction of the stylus is perpendicular to the longitudinal direction of the film. The protrusion line density (hereinafter referred to as "Pd") means the number of protrusions per a unit length obtained by dividing the number of protrusions higher than a prescribed height in a roughness curve obtained by measuring the surface roughness as mentioned above over a length of 30 mm, with this measured length. For example, the protrusion line density of the protrusions with a height of not smaller than 0.05 μm (hereinafter referred to as Pd(0.05)) is the number of protrusions per a unit length obtained by dividing the number of protrusions having a height of not smaller than 0.05 μm obtained according to the above-described method with the measured length.

The protrusion line density of the protrusions with a height of not smaller than 0.1 um Pd(O.1) of the surface of the film may preferably be not less than 1.0 protrusion/mm in view of the ease of handling of the film. Further, the protrusion line density of the protrusions with a height of not less than 0.2 μm Pd(0.2) may preferably be not more than 2.0 protrusions/mm in view of the withstand voltage of a capacitor employing the film of the present invention as the dielectric.

The center line average roughness Ra of the PPS film of the present invention may preferably be 0.05 μm to 0.12 μm, more preferably 0.005 μm to 0.10 μm in view of the ease of handling of the film and the electromagnetic conversion characteristics of a recording medium employing the film as its base film, as well as in view of the fact that, when the film is employed as the dielectrics of a capacitor, it is easy to form the capacitor element and the adhesion of the film with the aluminum thin layer is good.

The present invention also provides a capacitor comprising a biaxially oriented film of the present invention as the dielectrics and an inner electrode made of a metal foil or a metal thin layer.

The term "metal foil" herein means a self-supporting metal film. The thickness of the metal layer may preferably be 2 μm to 15 μm. The term "metal thin layer" herein means a non-self-supporting metal layer formed on the biaxially oriented PPS film support by vacuum deposition method, sputtering method, plating method or the like. The thickness of the metal thin layer may preferably be 0.01–0.5 μm.

The material of these metal films is not restricted, and preferred examples of the material include aluminum, zinc, tin, copper, nickel, chromium, iron and titanium as well as the mixtures and alloys thereof.

The structure of the capacitor of the present invention may be conventional. For example, the capacitor may be prepared by winding or stacking the polyphenylene sulfide film employing the above-mentioned metal film as the inner electrode. The capacitor which has the metal thin layer as the inner electrode and which has a laminated structure is a capacitor prepared by stacking the polyphenylene sulfide films having the metal thin layer formed on only one surface thereof, or by stacking a polyphenylene sulfide film having the metal thin layers formed on both surfaces thereof and a polyphenylene sulfide film on which the metal thin layer is not formed, to constitute a capacitor and by providing the capacitor with an outer electrode and, if necessary, an encapsulation.

Although the capacitor of the present invention comprises polyphenylene sulfide film as the major dielectrics, the entire dielectrics may not necessarily be polyphenylene sulfide film, and other resin composition films such as, for example, polyethyleneterephthalate, polyethylenenaphthalate, polyolefins, polycarbonates, polyphenyleneoxides, polyetherether ketones and polyether imides may be coemployed in the amount not adversely affecting the heat resistance, thermal characteristics and the like which are advantageous features of the polyphenylene sulfide.

The mode of the capacitor of the present invention is not restricted at all. That is, the capacitor may be selected from any well-known capacitors such as capacitors with lead wires or without leads (so called chip capacitors) and is not restricted thereto. The encapsulation may also be provided by any method such as resin molding and resin dipping, or the capacitor may be encapsulated in a case. Further, the capacitor may have substantially no encapsulation such that the surface of the capacitor is coated with a thin resin layer, or the capacitor may have no encapsulation at all.

The present invention further provides a magnetic recording medium comprising a biaxially oriented PPS film of the present invention having a magnetic layer on at least one surface thereof. The magnetic layer and its manufacturing method are well-known in the art, and any of them may be employed in the present invention. For example, a magnetic solid such as $\gamma$-$Fe_2O_3$, $CrO_2$, Fe, Ni, Co and the like may be applied to the base film together with an organic binder, or the magnetic layer may be provided in the form of a thin layer by plating, vapor deposition or sputtering. In cases where the magnetic solid is applied together with an organic binder, the thickness of the magnetic layer is adjusted to about 0.1 $\mu$m to 10 $\mu$m, and various organic polymers such as polyurethane-based resins, polyvinyl chloride-based resins, epoxy resins, polyester resins, polyvinyl chloride-based resins and silicone resins may be employed as the organic binder. In cases where the magnetic layer is in the form of a thin layer, the magnetic layer usually has a thickness of 1 $\mu$m or less, and any recording mode such as horizontal type and vertical type may be employed.

The process of manufacturing the polyphenylene sulfide film of the present invention will now be described.

The process of manufacturing the polyphenylene sulfide polymer per se is well-known in the art and any process of manufacturing polyphenylene sulfide may be employed. The process in which an alkali sulfide and p-dihalobenzene are reacted in a polar solvent under high temperature and high pressure is preferred. A process in which sodium sulfide is reacted with p-dichlorobenzene in an amide-based polar solvent such as N-methyl-2-pyrrolidone is especially preferred. In this case, it is most preferred to conduct the reaction under the presence of a polymerization modifier such as alkali metal carboxylates at a temperature of 230°-280° C. so as to adjust the polymerization degree. The pressure in the polymerization system and the polymerization time may appropriately be selected depending on the polymerization modifier employed, the amount thereof and the desired polymerization degree.

After the polymerization, the system is cooled to precipitate the polymer and the resulting polymer is dumped into water to form a slurry. The slurry is then filtered, washed with water and dried to obtain poly-p-phenylene sulfide powder.

A slurry in which the fine particles are dispersed in a liquid medium is then added to the PPS powder obtained as mentioned above and the mixture is well agitated with high speed agitation means such as Henchel mixer. The resulting mixture is then supplied to an extruder with at least one step of vent port and is well stirred under melted condition in the extruder. Thereafter, the liquid medium is eliminated from the vent and the resultant is extruded from an appropriate spinerret to obtain a resin composition containing polyphenylene sulfide as the major component.

In the present invention, the fine particles are dispersed in a liquid medium to form a slurry (this may be hereinafter referred to as "fine particle slurry"), which liquid medium has a boiling point of 180°-290° C., preferably 180°-250° C. If the boiling point of the liquid medium is lower than the lower limit of the above-mentioned range, secondary co-aggregates of the fine particles are likely to be formed during the polyphenylene sulfide containing the slurry is stirred under melted condition. On the other hand, if the boiling point of the liquid medium is higher than the upper limit of the above-mentioned range, it is difficult to eliminate the liquid medium from the vent after the polyphenylene sulfide containing the slurry is stirred under melted condition. Examples of the liquid medium include ethyleneglycol, triethyleneglycol, N-methylpyrrolidone and diphenyl ether. The liquid medium such as the former two liquid media which do not dissolve polyphenylene sulfide at a temperature equal to its boiling point or higher is preferred. The fine particles are dispersed in the slurry such that the average particle size thereof is not larger than 3 $\mu$m, preferably not larger than 1.5 $\mu$m. The method of preparing such fine particles is not restricted. Examples of the method include a method in which the fine particles are added to the liquid medium and then dispersed by the aid of dispersing means such as a ball mill and a vibration mill, followed by filteration, if required, and a method in which the fine particles are generated in the liquid medium and are grown to an appropriate particle size to form a sol, and the sol is subjected to solvent exchange or filtration, if necessary. The latter method is preferred in view of the fact that a slurry containing fine particles with small specific gravity and with high uniformity of the particle size may be obtained. The average particle size of the fine particles in the slurry may preferably be not smaller than 0.01 um in view of the stability against secondary co-aggregation. The content of the solid fine particles in the slurry may preferably be 10-70% by weight.

In the process of manufacturing the PPS film of the paresent invention, after the above-described fine particle slurry is added to the PPS powder, the mixture is uniformly mixed and the resultant is supplied to an extruder. The uniform mixing of the PPS powder and the fine particle slurry may preferably be attained by high speed agitation means such as a Henschel mixer. Further, in this agitation step, temperature of the materials may preferably be kept at a temperature lower than the boiling point of the dispersion medium of the slurry by 50° C. or more so as to prevent the evaporation of the liquid medium. The amount of the fine particle slurry added to PPS is adjusted to 1% to 100% in terms of the weight of the fine particles with respect to the weight of the PPS powder. The amount of the liquid component may preferably be 1% to 80% by weight with respect to the PPS powder. The resulting mixture is then supplied to an extruder having at least one step of vent port and is stirred under melted condition in the extruder. Thereafter, the liquid component in the mixture is removed from the vent and the resultant is extruded from an appropriate spinneret to obtain a resin composition. In cases where an extruder with two or more steps of vents, the last venting should be conducted under melted condition. Even in cases where a part of the liquid component in the mixture which has not yet melted is removed from a vent, the amount of the removed liquid component may preferably be not more than 50% by weight with respect to the total liquid medium. In any case, it is necessary that the state in which at least the liquid dispersion medium, the fine particles and the melted polymer co-exist in the cylinder of the extruder is attained. By such an operation, the liquid component in the polymer is removed without forming foam and to a degree at which defects are not covered due to the evaporation of the liquid component as would be the case when the finally obtained resin composition is extruded from an extruder having no vents.

In the above-described method, the PPS powder and the fine particles are mixed before being supplied to an extruder. However, it is also possible to first supply PPS powder to an extruder and to compulsively inject the fine particle slurry to the cylinder of the extruder through an opening formed in the extruder before and/or after the polymer is melted. The injection may be conducted continuously while extruding the resin composition. The other manufacturing conditions are the same as described above.

In either above-described method, the desired resin composition may be obtained by extruding PPS in which the fine particles are dispersed through an appropriate spinneret mounted on the extruder. The resin composition may be in any form such as films, sheets, fibers and various other molded articles as well as pellets. The resin composition may often be in the form of pellets and used as a material for producing molded articles, films, sheets or fibers with or without being mixed with another composition (such as, for example, natural pellets of PPS).

The thus obtained resin composition containing PPS as the major component may be formed into a film, preferably a biaxially oriented film by a well-known method (e.g., Japanese Patent Disclosure (Kokai) No. 111235/80). Thus, although not limited, for example, the resin composition may be supplied to an extruder and melted therein, and extruded through a T die onto a cooling drum to obtain a non-oriented sheet. The nonoriented sheet is then biaxially stretched simultaneously or sequentially at a temperature of 80°-120° C. with an area stretching ratio of preferably not less than 4 times, and the resultant sheet is heat set under tension at a temperature not lower than 180° C. and not higher than the melting point to obtain an intermediate. The intermediate may then be heat treated at 30°-120°C. for 5 seconds to 10 days. The duration of the heat treatment may appropriately be selected depending on the temperature employed. In general, the lower the temperature of the heat treatment, the longer the duration of the heat treatment. The heat treatment may be conducted continuously with the production of the intermediate in the film-production line, or may be conducted after the film is wound about a roll. In the latter case, the heat treatment may be continuously conducted while unwinding the film or may be conducted by placing a roll in an air circulating oven. The heat treatment may be conducted in two or more steps under different temperatures. By the above-described process, the polyphenylene sulfide film of the present invention may be obtained.

A capacitor having the polyphenylene sulfide film of the present invention as the dielectric and the magnetic recording medium having the polyphenylene sulfide film of the present invention as the base film may be manufactured by any conventional method well-known in the art.

The method of measuring various characteristics concerning the present invention and the methods of evaluation of effects which are employed in the examples hereinbelow described will now be described in summary.

METHODS OF MEASURING CHARACTERISTICS AND EVALUATING EFFECTS (1) Average Particle Size of Fine particles in Fine particle Slurry The slurry is diluted with the same liquid medium and the particle size of the fine particles was measured by subjecting the diluted slurry to an optical particle size distribution-measuring apparatus (CAPA5000 commercially available from Horiba Seisakusho).

(2) Crude Particles (a)

The crude particles were observed with a microscope. More particularly, a film with a thickness of about 10 $\mu$m was prepared and was observed with an optical microscope. The number of the particles having a longer diameter of not smaller than 10 $\mu$m was counted.

(3) Crude Particle (b)

Resin composition was supplied to an extruder after diluting with PPS natural resin so that the content of the fine particles in the polymer is 1% by weight and was extruded through a filter made of a metal fiber unwoven fabric mounted on the exit of the extruder, which filter had a filtration area of 10 cm$^2$ and a filtration precision of 5 $\mu$m (90% cut) at a rate of 5 kg/hr. The volume of the resin composition extruded until the filtration pressure became twice that at the initiation of the extrusion was determined. Needless to say, the more the extruded volume, the less the crude particles.

(4) Insulation Defects of Film

A sample film (200 mm×250 mm) was intimately sandwiched between a brass electrode (150 mm×200 mm, surface roughness of not more than 2S) and a vapor deposited surface of a polyester film vapor-deposited with aluminum, and the number of insulation defects after DC voltage of 150 V/um was applied thereto for 90 seconds.

(5) Evaluation of Stability of Initial Capacitance of Capacitor

One thousand capacitors were manufactured under the same conditions and the capacitance of each capacitor was measured using an automatic capacitance bridge. The distribution of the capacitance (standard deviation) was expressed in %, which is defined as the initial capacitance stability. The smaller this value, the higher the stability.

(6) Evaluation of Fraction Defective of Withstand Voltage of Capacitor

One thousand capacitors were manufactured under the same conditions and the withstand voltage of each capacitor was measured. The percentage of the capacitors which did not have a prescribed withstand voltage is defined as the fraction defective of withstand voltatage. A voltage increasing at a rate of 100V/sec. was applied, and the withstand voltage was defined as the voltage at which a current of not less than 10 mA flowed. The prescribed withstand voltage was 50V per 1 $\mu$m.

(7) Magnetic Conversion Characteristics and Drop Out

Magnetic coating solution was coated on a film with a gravure roll and the resulting magnetic layer was magnetically oriented, followed by drying the coated film. The film was then subjected to a calender treatment with a small test calendering apparatus (steel roll/-Nylon roll, 5 steps) at 70° C. under a line pressure of 200 kg/cm, and the resulting film was cured at 70° C. for 48 hours. The thus obtained raw tape was slit to a width of ½ inch to prepare a pancake. A length of 250 m was cut from the pancake and was mounted in a VTR cassette to prepare a VTR cassette tape.

The thus prepared tape was set in a home VTR and 100% chroma SIN was measured using a television testing wave generator (TG7/U706) manufactured by Shibasoku Co., Ltd. The number of drop was also measured for this tape on which the testing wave was recorded. Each drop out with a time width of not less than 5 μsec. and with an attenuation of the regenerated signal of not smaller than 16 dB was counted. The measurement of the drop outs was performed for 10 cassette tapes and the tapes with less than 10 drop outs per 1 minute are indicated by the mark "⊚", those with 10–40 drops out per 1 minute are indicated by the mark "", those with 40–60 drop outs per 1 minute are indicated by the mark "Δ", and those with more than 60 drop outs per 1 minute are indicated by the mark "X". If the rating is not worse than "Δ", the number of drop outs is considered small and the electromagnetic conversion characteristics are evaluated to be good.

(8) Average Diameter of Fine particles

PPS is removed from the film by low temperature plasma ashing treatment (for example, by using type PR-503 commercially available from Yamato Kagaku Co., Ltd) to expose the particles. The treatment conditions were selected such that the PPS is ashed while the fine particles are not damaged. The resultant ash was observed with a scanning electromicroscope, and the image of the fine particles was processed with an image analyzer (e.g., QTM900 commercially available from Cambridge Instrument). Not less than 5000 particles were observed changing the observation area and the observed image was processed according to the following mathematical treatment. The thus obtained number average particle size D is defined as the average particle size.

$$D = \Sigma Di/N$$

wherein Di represents circle-corresponding diameter of the particle and N represents the number of particles.

(9) 10% Weight Loss Temperature by TGA

The 10% weight loss temperature was measured using thermogravimetric analyzer (TGA) TG30M commercially avialble from Shimazu Seisakusho, Co., Ltd. under nitrogen atmosphere at a heating rate of 10° C./min. The sample weight was 5 mg.

(10) Single Particle Index

Cross sections of the film were observed by photographing the same with a transmission type electromicroscope (TEM). If the magnification is set to 100,000 times, a single particle which cannot be divided any more can be observed. The single particle index is defined as (A-B)/A wherein A represents the total area occupied by the particles and B represents the area occupied by aggregates consisting of two or more particles. The conditions of TEM are as follows, and 500 fields of view with 2 square micrometers were observed:

Apparatus: JEM-1200EX commercially available from Nippon Electron Co., Ltd.
Magnification: 100,000 x
Acceleration Voltage: 100 kV
Thickness of Sections: About 100 nm

(11) Sphericity

Sphericity is defined as the ratio of longer diameter of particles (average value)/shorter diameter of particles (average value), measured as in (1), the longer diameter and the shorter diameter being caluculated by the following equations:

Longer Diameter = $\Sigma D1i/N$
Shorter Diameter = $\Sigma D2i/N$ wherein D1i and D2i represent longer diameter (maximum diameter) and shorter diameter (minimum diameter) of each particle, respectively, and N represents the total number of the particles.

(12) Surface Gloss Gs (60°)

The surface gloss Gs (60°) is measured in accordace with the 60°mirror surface gloss method defined in JIS Z-8741 (1962).

(13) Crude Protrusions

Using a double beam interference microscope, the protrusions of H3 or more (i.e., the protrusions giving three or more interference rings) are counted for 100 cm² of the film.

(14) Center Line Average Surface Roughness Ra

The center line average surface roughness was measured using a high precision thin film level difference-measuring apparatus ET-10 commercially available from Kosaka Kenkyusho, Co., Ltd. The conditions were as follows and the average of 20 times measurement was employed as the average value.

Radius of Tip of Stylus: 0.5 μm
Load of Stylus: 5 mg
Length of Measured Portion: 1 mm
Cut Off Value: 0.08 mm It should be noted that the definition of Ra is described in, for example, Jiro NARA, "Method of Measuring and Evaluating Surface Roughness" published by Sogo Gijutsu Center, 1983.

(15) Height of Protrusions

Using high precision thin film level difference-measuring apparatus ET-10 commercially available from Kosaka Kenkyusho, Co., Ltd., the stylus was moved at a velocity of 0.1 mm/sec and a roughness curve was obtained with a longitudinal magnification of N times. The height of the "i"th protrusion Pi is defined as $Pi = (Mi - Vi)/N$ wherein Mi represents the level of the top of the "i"th peak and Vi represents the level of the valley at the left side of the "i"th peak. The moving direction of the touching pin is perpendicular to the longitudinal direction of the film. The conditions were as follows and the average of 20 times measurement was employed as the protrusion height:

Radius of Tip of Stylus: 0.5 μm
Load of Stylus: 5 mg
Length of Measured Portion: 1 mm
Cut Off Value: 0.08 mm

(16) Protrusion Line Density

The number of the protrusions with at least a prescribed height was counted in a surface roughness curve obtained by measuring the surface roughness over a length of 30 mm using a high precision thin film level difference-measuring apparatus ET-10 commercially available from Kosaka Kenkyusho, Co., Ltd., and the counted number was divided with the measured length to obtain the number of protrusions per a unit length, which is defined as the protrusion line density. For example, the protrusion line density of protrusions with a height of 0.05 μm or more is the number of protrusions per a unit length calculated by dividing the number of protrusions with a height of at least 0.05 μm with the measured length.

The invention will now be described in more concretely by way of examples. It should be noted that the Examples are presented for the illustration purpose only and should not be interpreted in any restrictive way.

EXAMPLES

Example 1

In a stainless steel autoclave, 32.6 kg of sodium sulfide (250 moles, containing 40% by weight of crystal water), 100 g of sodium hydroxide, 36.1 kg (250 moles) of sodium benzoate and 79.2 kg of N-methyl-2-pyrrolidone (this may be hereinafter referred to as "NMP") were fed. After removing water at 205° C., 37.5 kg (255 moles) of 1,4-dichlorobenzene (this may be hereinafter referred to as "p-DCP" and 20.0 kg of NMP were added thereto and the resulting mixture was reacted for 4 hours at 265° C. The reaction product was washed with water and dried to obtain 2.2 kg (yield of 78%) poly-p-phenylene sulfide powder containing 100 mol % of p-phenylenesulfide with a melt viscosity of 3300 poise.

To 100 parts by weight of the thus prepared powder, 5 parts by weight of ethyleneglycol slurry (solid content of 20%) containing colloidal silica with a sphericity of 1.3 and an average particle size of 0.5 um was added and the resulting mixture was stirred at high speed with a Henchel mixer at 50° C.

The resulting mixture was supplied to an extruder with one step of vents and with two axes rotating in the different directions, and was melted at 310° C. The ethyleneglycol was removed from the melted resin through the vents. Thereafter, the melted polymer was extruded from a spinneret with a diameter of 3 mm and the extruded resin was rapidly cooled, followed by being cut into pellets to obtain a resin composition of the present invention containing polyphenylene sulfide as major component, which contains 1.0% by weight of colloidal silica with respect to the polymer (this resin is hereinafter referred to as "resin A-1").

The resin A-1 was melted at 310° C. in an extruder having a diameter of 40 mm. The melted resin was filtered through a filter made of metal fibers, which had a 95% cutting pore diameter of 10 μm, and then extruded from a T die having a linear lip with a length of 400 mm and a clearance of 1.5 mm thickness. The extruded sheet was then cast onto a metal drum kept at 25° C. to cool and solidify the sheet to obtain a non-oriented film. The film was then stretched in the longitudinal direction with a longitudinal stretching apparatus comprising a plurality of rolls at a stretching ratio of 3.7 times the original length and at a stretching rate of 30000%/min. at 100° C. The resulting film was then stretched in the transverse direction using a tenter at a stretching ratio of 3.4 times the original length and at a stretching rate of 1000%/min at 100° C. The resulting film was then heat set in a heat treatment chamber in the same tenter at 270° C. for 10 seconds under tension to obtain a biaxially oriented PPS film with a thickness of 2 μm (hereinafter referred to as film A-1).

Aluminum was then vapor-deposited in vacuum on the thus prepared biaxially oriented PPS film so as to attain a surface resistance of 2Ω. The aluminum was deposited in the form of a stripe such that margin regions along the longitudinal direction of the film are left (repetition of a deposited region with a width of 8.0 mm and a margin region of 1.0 mm width). The resulting film was slit such that the center of each deposited region and the center of each margin region were cut with a razor to obtain tapes with an overall width of 4.5 mm having a margin region of 0.5 mm width at the left or right side, and the resulting tapes were reeled. The thus prepared reel is hereinafter referred to as reel 1.

One tape with the margin region at the left side and one tape with the margin region at the right side were stacked and wound to obtain a wound body with a capacitance of about 0.1 μF. In this case, the tapes were stacked such that the longitudinal left edge of the tape with a margin region at the right side is protruded by 0.5 mm from the longitudinal left edge of the tape with a margin region at the left side.

A core was removed from the wound body and the resultant was pressed as it is at 180° C. under a pressure of 10 kg/cm$^2$ for five minutes. To the both edge faces of the pressed wound body, metal spray was sprayed to form outer electrodes, and a lead wire was welded to the each electrode to obtain a wound capacitor. The evaluation results of the film and the capacitor are shown in Table 1.

Example 2

The PPS powder prepared in Example 1 alone was supplied to the extruder used in Example 1 and melt extruded at 310° C. at a rate of 20 kg per hour. Simultaneously, the slurry of the colloidal silica in ethyleneglycol used in Example 1 was injected to the extruder from a port formed at a feeding portion of the extruder at a rate of 1 kg/hr. As in Example 1, the ethyleneglycol was removed from the melted resin at the venting portion of the extruder. Thereafter, the melted polymer was extruded from a spinneret with a diameter of 3 mm and the extruded resin was rapidly cooled, followed by being cut into pellets to obtain a resin composition of the present invention containing polyphenylene sulfide as major component, which contains 1.0% by weight of colloidal silica with respect to the polymer (this resin is hereinafter referred to as "resin B-1").

Using the thus prepared resin, the same procedure as in Example 1 was repeated to obtain a biaxially oriented PPS film (film B-1) with a thickness of 2 μm.

A wound capacitor was prepared from the thus obtained film in the same manner as in Example 1. The results of the evaluation of the film and the capacitor are shown in Table 1.

Example 3

A biaxially oriented PPS film with a thickness of 2 μm (film C-1) was prepared in the same manner as in Example 1 except that crosslinked polystyrene particles with a sphericity of 1.1 and an average particle size of 0.5 μm were employed in place of the collidal silica with an average particle size of 0.5 μm.

A wound capacitor was prepared from this film as in Example 1.

The results of the evaluation of the film and the capacitor are shown in Table 1.

Comparative Example 1

The silica sol employed in Example 1 was evaporated to dryness after exchanging the liquid medium with water to prepare silica fine particles with an average particle size of 0.5 μm (determined by a method similar to the measuring method (8)). one part by weight of the thus prepared particles were added to 100 parts by weight of the PPS powder employed in Example 1 and the resulting mixture was stirred at high speed with a Henschel mixer at 50° C.

The thus obtained mixture was supplied to an extrder having no vents, which had two axes rotating in the same direction, and was agitated in melted state at 310° C. The melted polymer was then extruded from a spinneret with a diameter of 3 mm and the extruded polymer was rapidly cooled, followed by being cut in the form of pelletes to obtain a resin composition containing polyphenylene sulfide as major component, which contains 1.0% by weight of colloidal silica with respect to the polymer (this resin is outside the scope of the present invention and hereinafter referred to as "resin D-1").

A wound capacitor was prepared as in Example 1 from this film.

The results of the evaluation of the film and the capacitor are shown in Table 1.

Comparative Example 2

A biaxially oriented film of 2 μm thickness was prepared in the same manner as in Example 1 except that colloidal silica with a sphericity of 1.1 and an average particle size of 0.008 μm was used in place of the colloidal silica with an average particle size of 0.5 μM (film E-1 and resin E-1).

The results of the evaluation of the film and the capacitor are shown in Table 1.

Comparative Example 3

A biaxially oriented film of 2 μm thickness was prepared in the same manner as in Example 1 except that colloidal silica with a sphericity of 1.3 and an average particle size of 3.5 μm was used in place of the colloidal silica with an average particle size of 0.5 μm (film F-1 and resin F-1).

The results of the evaluation of the film and the capacitor are shown in Table 1.

It can be seen from the Examples 1, 2 and 3 and Comparative Examples 1, 2 and 3, that PPS having dispersed fine particles and only a small amount of crude particles may be obtained according to the present invention, so that the film made from the resin composition has only reduced number of crude protrusions at the surface and only reduced number of insulation defects. As a result, the fraction defective of the withstand voltage of the capacitor made from the film is reduced to an extremely low level.

Examples 4-5, Comparative Examples 4-6

Ten parts of a slurry containing colloidal silica fine particles in the amount of 10% in terms of the solid content in a liquid medum shown in Table 1 was added to the PPS powder employed in Example 1 and the resulting mixture was then stirred at high speed at 50° C.

The resulting mixture was supplied to an extruder with one step of vents and with two axes rotating in the different directions, and was melted at 310° C. The polyethyleneglycol was removed from the melted resin through the vents. Thereafter the melted polymer was extruded from a spinneret with a diameter of 3 mm and the extruded resin was rapidly cooled, followed by being cut into pellets to obtain a resin composition of the present invention containing polyphenylene sulfide as major component, which contained 1.0% by weight of colloidal silica with respect to the polymer.

A biaxially oriented PPS film with 2 μm thickness was prepared from these resins as in Example 1.

Wound capacitors were prepared from the films as in Example 1.

The results of the evaluation of the films and the capacitors are shown in Table 1.

Example 6

A biaxially oriented PPS film with a thickness of 15 um (film G-1) was prepared as in Example 1 from the resin composition containing polyphenylene sulfide as the major component obtained in Example 1 (resin A-1).

A magnetic coating solution with the composition described below was applied with a gravure roll on the thus prepared biaxially oriented PPS film, and the coated magnetic layer was magnetically oriented, followed by drying the magnetic layer. The thus obtained film was subjected to a calendering treatment at 70° C. under a line pressure of 200 kg/cm using a small test calendering apparatus (steel roll/Nylon roll, 5 steps), and the resultant was cured at 70° C. for 48 hours. From the thus prepared pancake, a length of 250 m was cut and was set in a VTR cassette to provide a VTR cassette tape (magnetic recording medium).

The results of the evaluation of the film and the magnetic recording medium are shown in Table 2.

(Composition of Magnetic Coating Solution)

Co-containing Iron (BET value of 50 m²/g): 100 parts

Elex A (vinyl chloride/vinyl acetate copolymer commercially available from Sekisui Chemicals, Inc.): 10 parts by weight Coronate L (polyisocyanate commercially available from Nippon Urethane, Co., Ltd.): 5 parts by weight Lecitin: 1 part by weight Methylethyl Ketone: 75 parts by weight Carbon Black: 2 parts by weight Lauric Acid: 1.5 parts by weight Example 7

A biaxially oriented PPS film with a thickness of 15 μm (film H-1) was prepared in the same manner as in Example 2 except that the resin composition of Example 2 (i.e., resin B-1) was used.

A VTR cassette tape (magnetic recording medium) was prepared from the film as in Example 6. The results of the evaluation of this film and the magnetic recording medium are shown in Table 2.

Comparative Example 6

A biaxially oriented PPS film with a thickness of 15 μm (film I-1) was prepared in the same manner as in Example 6 except that the resin composition of Comparative Example 1 (resin D-1) was used.

A VTR cassette tape (magnetic recording medium) was prepared from the film as in Example 6. The results of the evaluation of this film and the magnetic recording medium are shown in Table 2.

Comparative Example 7

A biaxially oriented PPS film with a thickness of 15 μm (film J-1) was prepared in the same manner as in Example 6 except that the resin composition of Comparative Example 2 (resin E-1) was used.

A VTR cassette tape (magnetic recording medium) was prepared from the film as in Example 6. The results of the evaluation of this film and the magnetic recording medium are shown in Table 2.

Comparative Example 8

A biaxially oriented PPS film with a thickness of 15 μm (film K-1) was prepared in the same manner as in Example 6 except that the resin composition of Comparative Example 3 (resin F-1) was used.

A VTR cassette tape (magnetic recording medium) was prepared from the film as in Example 6. The results of the evaluation of this film and the magnetic recording medium are shown in Table 2.

As can be seen from the Examples 6 and 7, and Comparative Examples 6, 7 and 8 that a biaxially oriented PPS film on which surface the number of crude protrusions is reduced can be prepared according to the process of the present invention, so that a magnetic recording medium having excellent drop out characteristics and excellent magnetic conversion characteristics may be prepared by employing the PPS film as its base film.

TABLE 1-1

| | Average Particle Size of Fine particles in Slurry (μm) | Liquid Medium of Slurry | Fine Particles | Sphericity of Fine Particles | Particle size of Fine Particles in Film (μm) | Single Particle Index | Gloss of Film Gs (60°) (%) | Protrusion line Density Pd (0.05) of Film (Protrusions/mm) |
|---|---|---|---|---|---|---|---|---|
| Example 1 | 0.50 | Ethyleneglycol | Colloidal Silica | 1.3 | 0.55 | 0.9 | 160 | 6.5 |
| Example 2 | 0.50 | Ethyleneglycol | Colloidal Silica | 1.3 | 0.60 | 0.9 | 150 | 6.0 |
| Example 3 | 0.50 | Ethyleneglycol | Crosslinked polystyrene | 1.1 | 0.52 | 0.9 | 155 | 7.0 |
| Example 4 | 0.45 | N-methylpyrrolidone | Colloidal Silica | 1.3 | 0.60 | 0.8 | 140 | 5.2 |
| Example 5 | 0.47 | Triethyleneglycol | Colloidal Silica | 1.3 | 0.64 | 0.9 | 155 | 6.0 |
| Comparative Example 1 | 0.50 | not used | Colloidal Silica | 1.1 | 1.60 | 0.2 | 205 | 4.2 |
| Comparative Example 2 | 0.008 | Ethyleneglycol | Colloidal Silica | 1.3 | 0.03 | 0.8 | 120 | 24.0 |
| Comparative Example 3 | 3.50 | Ethyleneglycol | Colloidal Silica | 1.3 | 3.70 | 0.9 | 110 | 5.3 |
| Comparative Example 4 | 0.45 | Water | Colloidal Silica | 1.3 | 0.97 | 0.3 | 105 | 5.1 |
| Comparative Example 5 | 0.48 | p-xylene | Colloidal Silica | 1.3 | 0.79 | 0.4 | 120 | 5.8 |

TABLE 1-2

| | Large Particles (a) (particles/10 cm$^2$) | Large Particles (b) (kg) | Insulation Defects in Film (defects/m$^2$) | Initial Capacitance stability of Capacitor (%) | Failure of Withstand Voltage of Capacitor (%) |
|---|---|---|---|---|---|
| Example 1 | 0 | 3.2 | 15 | 4.2 | 1.1 |
| Example 2 | 0 | 2.9 | 17 | 4.5 | 1.3 |
| Example 3 | 0 | 3.1 | 13 | 3.9 | 0.9 |
| Example 4 | 1 | 2.7 | 20 | 4.8 | 1.6 |
| Example 5 | 0 | 2.5 | 22 | 4.9 | 1.8 |
| Comparative Example 1 | 40 | 0.8 | 134 | 14.0 | 18.7 |
| Comparative Example 2 | 26 | 1.5 | 77 | 12.0 | 11.9 |
| Comparative Example 3 | 8 | 2.8 | 98 | 6.9 | 19.6 |
| Comparative Example 4 | 35 | 0.9 | 129 | 13.1 | 17.5 |
| Comparative Example 5 | 29 | 1.2 | 102 | 10.9 | 18.1 |

TABLE 2-1

| | Average Particle Size of Fine particles in Slurry (μm) | Liquid Medium of Slurry | Fine Particles | Sphericity of Fine Particles | Particle size of Fine Particles in Film (μm) | Single Particle Index |
|---|---|---|---|---|---|---|
| Example 6 | 0.50 | Ethyleneglycol | Colloidal Silica | 1.3 | 0.55 | 0.9 |
| Example 7 | 0.50 | Ethyleneglycol | Colloidal Silica | 1.3 | 0.60 | 0.9 |
| Comparative Example 6 | 0.50 | Ethyleneglycol | Colloidal Silica | 1.3 | 1.60 | 0.2 |
| Comparative Example 7 | 0.008 | Ethyleneglycol | Colloidal Silica | 1.1 | 0.03 | 0.8 |
| Comparative Example 8 | 3.50 | Ethyleneglycol | Colloidal Silica | 1.3 | 3.70 | 0.9 |

TABLE 2-2

|  | Number of Large Protrusions on Film Surface (protrusions/100 cm²) | Ra of Film (μm) | Large Particles (a) (particles/10 cm²) | Large Particles (b) (kg) | Magnetic Conversion Characteristics of Magnetic Recording Media |
| --- | --- | --- | --- | --- | --- |
| Example 6 | 15 | 0.028 | 0 | 3.2 | ⊚ |
| Example 7 | 18 | 0.035 | 0 | 2.9 | ⊚ |
| Comparative Example 6 | 520 | 0.061 | 40 | 0.8 | X |
| Comparative Example 7 | 220 | 0.025 | 26 | 1.5 | X |
| Comparative Example 8 | 405 | 0.065 | 8 | 2.8 | X |

We claim:

1. A polyphenylene sulfide film which consists essentially of a resin composition containing polyphenylene sulfide as major constituent, in which fine particles having an average particle size of 0.05-3 μm are dispersed, the fine particles having a single particle index as defined herein of not less than 0.5.

2. The polyphenylene sulfide film of claim 1, which is a biaxially oriented film.

3. The film of claim 1 or 2, wherein the number of large protrusions X (protrusions/100 cm²) of the film satisfies the following equation (1).

$$x \leq 6000 Ra \quad (1)$$

wherein Ra represents the center line average surface roughness of the film surface.

4. The film of claim 1, wherein the gloss Gs(60°) of the film is 125% to 200%, and wherein protrusions higher than 0.05 μm exist on the film surface in a number of at least 5.0 protrusions/mm in terms of protrusion line density.

5. The film of claim 1, wherein the fine particles are selected from the group consisting of spherical silica, spherical crosslinked polystyrene and spherical silicone.

* * * * *